3,379,744
DEHYDROGENATION PROCESS FOR MANUFACTURE OF 3 - HYDROXY - 14β - ESTRA-1,3,5(10),6,8-PENTAEN-17-ONE AND ETHERS CORRESPONDING
Mike G. Scaros, Arlington Heights, and Roy H. Bible, Jr., Morton Grove, Ill., assignors to G. D. Searle & Co., Chicago, Ill., a corporation of Delaware
No Drawing. Filed Dec. 12, 1966, Ser. No. 600,731
5 Claims. (Cl. 260—397.45)

The present invention relates to a process for aromatization of the B-ring of steroids by dehydrogenation with a palladium catalyst in the presence of a suitable organic solvent. In particular, this invention is concerned with the manufacture of 3-hydroxy - 14β-estra - 1,3,5(10),6,8-pentaen - 17-one and the corresponding 3-(lower alkyl) ethers, which are estrogenic agents as reported by Bachmann et al., J. Am. Chem. Soc., 62, 824 (1940), by the dehydrogenation with palladium in a suitable organic solvent of 3-hydroxyestra - 1,3,5(10)-trien-17-one or a 3-(lower alkyl) ether thereof.

The term lower alkyl encompasses those radicals exemplified by methyl, ethyl, propyl, butyl, pentyl, hexyl, heptyl and the branched-chain isomers thereof.

Previous methods available for the manufacture of the products of the instant process suffer from a number of disadvantages. Butenandt et al., Ber. 74, 1308 (1941), thus describe a procedure involving the heating of 3-hydroxyestra-1,3,5(10)-trien-17-one with palladium black at 260° for 5 hours to afford 3-hydroxy - 14β - estra-1,3,5(10),6,8-pentaen-17-one. Only a 25% yield was obtained, however. Bachmann et al., J. Am. Chem. Soc., 72, 1323 (1950) subsequently disclosed that higher yields can be obtained by drastically reducing the reaction time, but operating at about the same temperature, i.e. 250°. The latter workers demonstrated that very careful control of reaction time was necessary to afford good yields since at temperatures above 250° and using somewhat longer reaction times, competing side reactions such as cleavage of the D-ring and aromatization of the C-ring were observed. At a temperature of 350° and a reaction time of 20 minutes, 3-methoxyestra - 1,3,5(10)-trien-17-one was thus converted to 7-methoxy - 1-ethyl - 2-methylphenanthrene in 71% yield. While the latter authors were able to carefully control the critical reaction conditions of time and temperature by operating on a very small scale, i.e. using milligram quantities, such careful control would be most impractical if not impossible when operating on a large scale. Heating the mixture just to the critical temperature and maintaining that temperature only for a very brief time would be exceedingly difficult and certainly not feasible on a commercial scale. Local overheating when using large quantities would, furthermore, be very likely.

The process of the present invention involves the surprising discovery that this dehydrogenation reaction can be effected at a much lower temperature than that described in the prior art, thus affording the desired product in yields of 70–80%. The present process also provides a convenient means of conducting large scale operations by the innovation of utilizing a suitable organic solvent. Control of the reaction temperature is thus easily maintained by selecting a solvent having a boiling point within the proper temperature range. The maximum temperature is automatically limited by the boiling point of the solvent, thus eliminating the aforementioned side reactions. The possibility of local overheating is likewise avoided by the use of a solvent.

Although inert organic solvents possessing boiling points up to 250° are suitable for use in the instant process, those boiling at temperatures of 150–200° are preferred. Suitable solvents are exemplified by anisole, phenol, mesitylene, etc. The reaction time will, of course, vary with the temperature of the reaction mixture, lower temperatures requiring longer reaction times. A particularly preferred solvent for conduct of the instant process is anisole. Palladium catalysts generally are suitable although those supported on carbon are particularly convenient.

A specific example of the present process is the refluxing of 3-hydroxyestra - 1,3,5(10)-trien-17-one in anisole solution with 10% palladium-on-carbon catalyst to afford 3-hydroxy-14β-estra-1,3,5(10),6,8-pentaen-17-one.

The invention will appear more fully from the examples which follow. These examples are set forth by way of illustration only and it will be understood that the invention is not to be construed as limited either in spirit or in scope by the details contained therein as many modifications both in materials and methods will be apparent to those skilled in the art. In these examples temperatures are given in degrees Centigrade (° C.). Quantities of materials are expressed in parts by weight unless otherwise noted.

Example 1

A mixture containing 500 parts of 3-hydroxyestra-1,3,5(10)-trien-17-one, 3000 parts of anisole and 160 parts of 10% palladium-on-carbon catalyst is heated at the reflux temperature with stirring for about 23 days, then is filtered while hot in order to remove the catalyst. The filtrate is cooled to room temperature, and the product which precipitates is collected by filtration and dried to yield 3-hydroxyestra - 1,3,5(10),6,8-pentaen-17-one, melting at about 262–265°.

The filtered catalyst is extracted first with hot dimethyl sulfoxide, then with hot pyridine, and the combined extracts are cooled and stirred, then diluted with water, thus affording additional 3-hydroxyestra-1,3,5(10),6,8-pentaen-17-one, melting at about 258–261°.

Example 2

A mixture of 200 parts of 3-methoxyestra-1,3,5(10)-trien-17-one, 1000 parts of anisole and 100 parts of 5% palladium-on-carbon catalyst is heated at the reflux temperature with stirring for about 23 days. Removal of the catalyst is effected by filtration of the hot mixture. The resulting filtrate is stripped of solvent by distillation under reduced pressure, and the resulting residue is purified by recrystallization from isopropyl alcohol to yield 3-methoxy-14β-estra-1,3,5(10),6,8-pentaen-17-one, melting at about 117.5–121°.

Example 3

The dehydrogenation of an equivalent quantity of 3-ethoxyestra-1,3,5(10)-trien-17-one by the procedure described in Example 2 results in 3-ethoxy-14β-estra-1,3, 5(10),6,8-pentaen-17-one.

What is claimed is:
1. A process for the manufacture of a compound of the formula

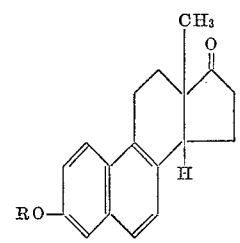

wherein R is selected from the group consisting of hydrogen and a lower alkyl radical, which comprises heating a compound of the formula

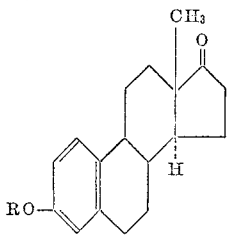

wherein R is as above defined, in an inert organic solvent with a palladium catalyst at a temperature sufficient to effect dehydrogenation.

2. As in claim 1, a process for the manufacture of a compound of the formula

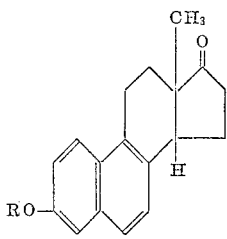

wherein R is selected from the group consisting of hydrogen and a lower alkyl radical, which comprises heating a compound of the formula

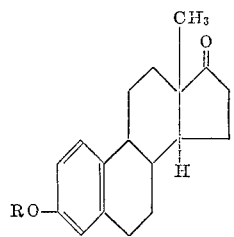

wherein R is as defined above, in an inert organic solvent with a palladium catalyst at a temperature of 150–200°.

3. The process of claim 1, wherein the inert organic solvent is refluxing anisole.

4. As in claim 1, a process for the manufacture of 3 - hydroxy - 14β - estra - 1,3,5(10),6,8 - pentaen - 17-one which comprises heating 3-hydroxyestra-1,3,5(10)-trien-17-one with a palladium catalyst in refluxing anisole solution.

5. As in claim 1, a process for the manufacture of 3 - methoxy - 14β - estra - 1,3,5(10),6,8 - pentaen - 17-one which comprises heating 3-methoxyestra-1,3,5(10)-trien-17-one with a palladium catalyst in refluxing anisole solution.

References Cited

Butenandt et al., Ber. 74, 1308 (1941).

Bachmann et al., "J. Am. Chem. Soc.," 72 (1950), page 1323.

Dreiding et al., "J. Amer. Chem. Soc.," vol. 75 (1953), page 3162.

ELBERT L. ROBERTS, *Primary Examiner.*